United States Patent [19]

Tansei et al.

[11] Patent Number: 4,676,290

[45] Date of Patent: Jun. 30, 1987

[54] PNEUMATIC TIRE EXCELLENT IN UNEVEN WEAR RESISTANCE

[75] Inventors: Hikaru Tansei, Kodaira; Kenichi Motomura, Higashiyamato, both of Japan

[73] Assignee: Bridgestone Corporation, Tokyo, Japan

[21] Appl. No.: 789,904

[22] Filed: Oct. 21, 1985

[30] Foreign Application Priority Data

Oct. 23, 1984 [JP] Japan .................................... 221137

[51] Int. Cl.$^4$ ............................................ B60C 11/11
[52] U.S. Cl. ............................................ 152/209 R
[58] Field of Search ........... 152/209 R, 209 D, 209 B; D12/142, 140, 136

[56] References Cited

U.S. PATENT DOCUMENTS

3,559,712  2/1971  Verdier ............................ 152/209 R
4,230,512  10/1980  Makino et al. .................... 152/209 R
4,550,756  11/1985  Hinkel ............................. 152/209 R

FOREIGN PATENT DOCUMENTS

2120183  11/1983  United Kingdom ............ 152/209 R

*Primary Examiner*—Michael W. Ball
*Attorney, Agent, or Firm*—Sughrue, Mion, Zinn, Macpeak, and Seas

[57] ABSTRACT

A pneumatic tire excellent in uneven wear resistance, is provided with a tread pattern which comprises a plurality of main grooves extending zigzag along the circumference of a tread, numerous transverse grooves linearly extending in at least one land portion defined between the adjacent main grooves and between the main grooves at a depth shallower than the main grooves, each one of said transverse grooves being provided in every one zigzag pitch of the main groove, a number of blocks separatedly formed and arrayed by the main grooves and the transverse grooves, and a pair of notch grooves provided in each of the blocks and branching from the main grooves sandwiching the block for mitigating difference in rigidity between the edge portions and the central portion of the block.

9 Claims, 3 Drawing Figures

FIG_1a
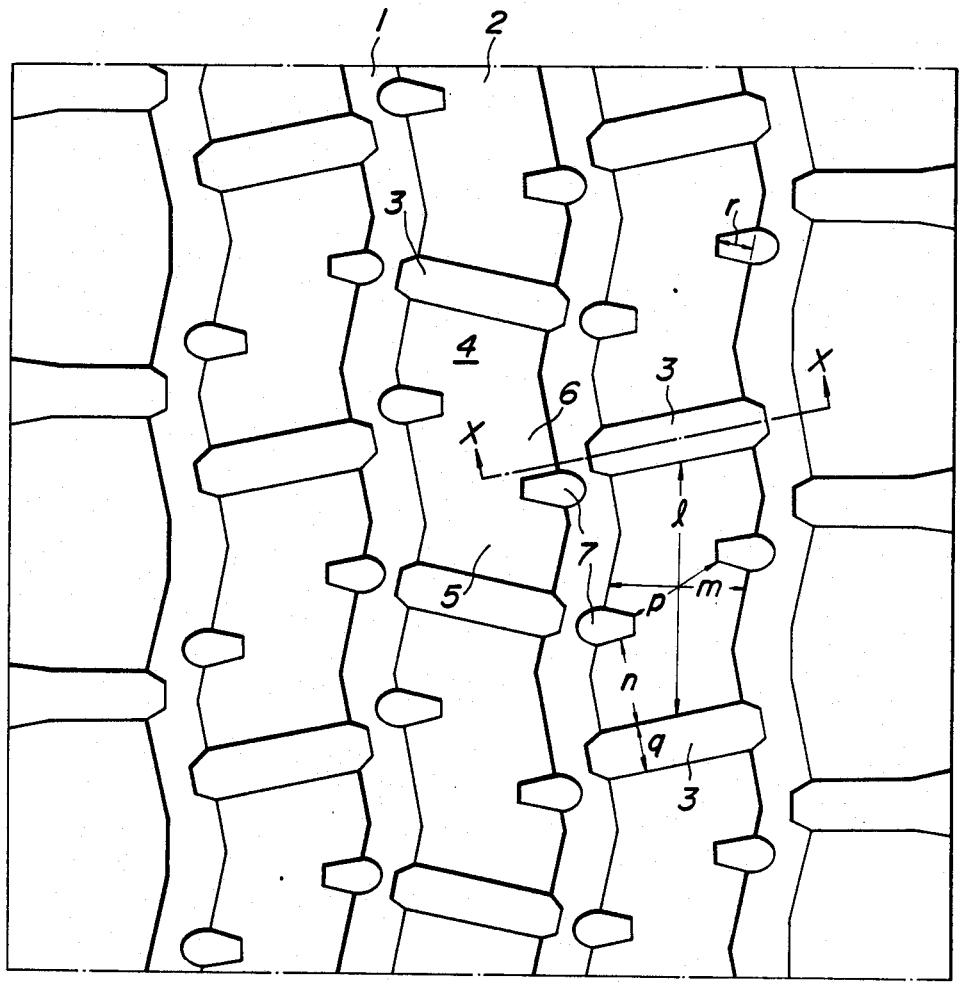
FIG_1b
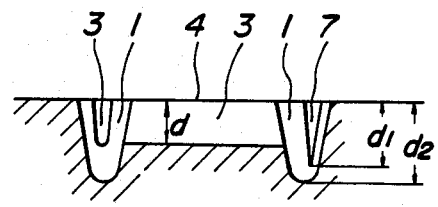

PNEUMATIC TIRE EXCELLENT IN UNEVEN WEAR RESISTANCE

BACKGROUND OF THE INVENTION

1. Field of the Invention

The present invention relates to a pneumatic tire, and particularly to a heavy duty pneumatic tire such as for trucks and buses in which uneven wear, especially a so-called heel and toe wear, is intended to be prevented. More specifically, the invention relates to a pneumatic tire suited for a pattern classified into an "all season pattern".

2. Description of the Related Art

The all season pattern is ordinarily excellent in its traction property on snow and wet roads due to the arrangement of blocks which are separatedly formed and arrayed by a plurality of main grooves extending zigzag in the circumference of the tread and linear transverse grooves transversing land portions each defined by the adjacent main grooves at a pitch corresponding to substantially a half of the zigzag pitch of the main grooves. But on the other hand, it is likely to produce an uneven wear pattern called heel and toe wear.

This problem has been heretofore dealt with exclusively through making coarser the arranging pitch of the linear transverse grooves to reduce the number of the transverse grooves arranged as compared with ordinary cases in which said pitch is substantially one half of the zigzag pitch, but a satisfactory effect could not be obtained. Further, although the groove width of the transverse grooves may be widened to make the negative area uniform in this case, the reduction in the traction performance is unavoidable.

SUMMARY OF THE INVENTION

It is therefore an object of the present invention to fully reduce uneven wear such as heel and toe wear without deteriorating traction performance on snow and wet roads, that is, to advantageously accomplish both the traction performance and the uneven wear resistance.

In order to advantageously accomplish the reduction of the heel and toe wear in the block pattern usable as the all season pattern without damaging the traction performance, according to the present invention, there is a provision of a pneumatic tire excellent in uneven wear resistance which is provided with blocks formed and arrayed separatedly by a plurality of main grooves extending zigzag along the circumference of a tread and numerous transverse grooves linearly extending in at least one land portion defined by the adjacent main grooves and between the main grooves at a depth shallower than the main grooves, each one of said transverse grooves being provided in every one zigzag pitch of the main grooves, each of the blocks being provided with a pair of notch grooves each branched from the corresponding one of main grooves sandwiching the block for mitigating the difference in rigidity between the edge portions and the central portion of the block defined by the transverse grooves.

According to preferred aspects of the present invention, a pair of the notch grooves are so arranged that they may be spaced from each other by an interval at which the notch grooves are spaced from the adjacent transverse grooves; the notch groove has a length of from 0.2 to 0.4 time as long as the transverse width of the block; the depth of the notch groove is from 0.7 to 1.0 time, particularly not less than 0.85 time as deep as that of the main groove; the ratio of the longitudinal length and the lateral width is from 1.4 to 2.5; the groove width of the transverse grooves is from 0.5 to 0.7 time as wide as the interval between the transverse groove and the notch groove; and the depth of the transverse groove is from 0.3 to 0.6 time, particularly from 0.35 to 0.5 time as deep as that of the main groove.

These and other objects, features and advantages of the invention will be understood upon reading of the following description of the invention when considered in connection with the attached drawings with understanding that some modifications, variations and changes of the same could be easily done by the skilled in the art to which the invention pertains without departing from the spirit of the invention or the scope of the claims appended hereto.

BRIEF DESCRIPTION OF THE DRAWINGS

For the better understanding of the invention, reference is made to the drawings, wherein:

FIGS. 1a and 1b are a plan view and a sectional view of a tread pattern of a tire according to the present invention, respectively.

DETAILED DESCRIPTION OF THE INVENTION

Figure 2:
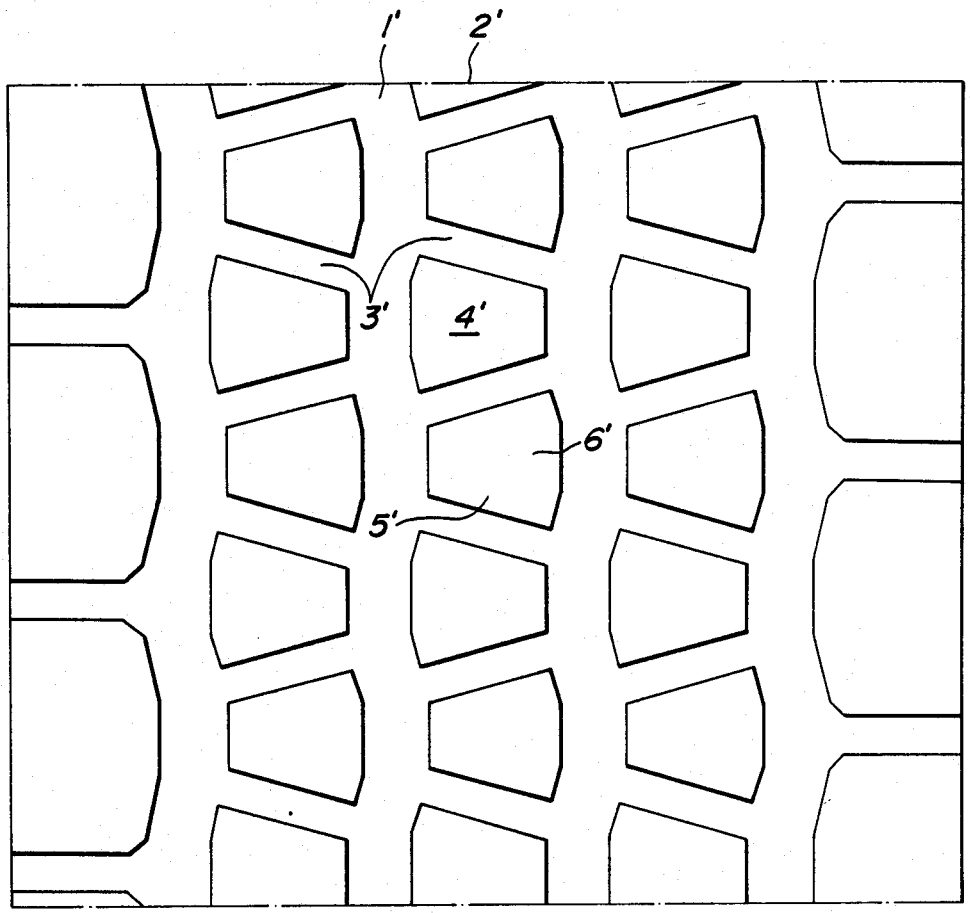
FIG. 2 is a view of a tread pattern of a conventional tire.

In FIG. 1 is shown a tread pattern of a pneumatic tire excellent in uneven wear resistance according to the present invention in which reference numerals 1, 2, 3 and 4 denote a main groove, a land portion, a transverse groove, and a block respectively. Reference numerals 5, 6 and 7 denote respectively an edge portion of the block, a central portion of the block, and a notch groove.

A plurality of the main grooves 1 extend zigzag along the circumference of the tread, and land portions 2 are formed between the adjacent main grooves. FIG. 1 illustrates four main grooves. The land portion is divided by the numerous transverse grooves 3 linearly extending between the adjacent main grooves 1 to form and array the blocks 4. In order to increase the rigidity of the block at the edge portion 5, the transverse groove 3 has a depth shallower than the main groove 1. On the other hand, the notch grooves 7 are formed branching from the main grooves 1 sandwiching the block 4 for reducing the rigidity of the block 4 at the central portion 6 to mitigate the difference in rigidity between the central portion and the edge portions of the block.

In contrast a typical embodiment of the conventional all season type patterns is shown in FIG. 2 in which land portions 2' are divided by transverse grooves 3' extending between the adjacent main grooves 1' at the same depth as that of the main grooves to form rows of blocks 4'. In this case, as mentioned above, although there is no problem with respect to the traction performance on the snow and wet roads, uneven wear called the heel and toe wear is likely to be produced. As mentioned above, satisfactory effects can not be obtained merely by countermeasure of reducing the number of transverse grooves 3' arranged with the arrangement pitch thereof being enlarged. Moreover the reduction in the traction performance can not be avoided even by enlarging the width of the transverse grooves.

The reason why the heel and toe wear is produced in the pattern shown in FIG. 2 is due to that the movement of the rubber on the road differs between the treading in portion and kicking out portion of the blocks. This is inevitable because the blocks 4' are divided by the transverse grooves 3'. Particularly, this is originated from the fact that the edge portions 5' of the blocks 4' are far lower in rigidity than the central portions 6' thereof.

Thus, it was found that when, as shown in FIG. 1, for the purpose of reducing the difference in rigidity between the edge portions and the central portion of the block, the depth d of the transverse grooves 3 is made slightly shallower than the depth $d_2$ of the main grooves 1 and the notch grooves 7 are cut at a relatively deep depth on the opposite side of each of the blocks 4 while extending from the main groove but not reaching the adjacent main groove so that the profile of the block may be in an S-letter shape or a Z-letter shape. Heel and toe wear can be effectively reduced without deteriorating the traction performance.

Experimental results revealed that the rigidity at the edge portion 5 of the block 4 is increased and the difference in rigidity is reduced to make the rigidity of the edge portion approach that of the central portion. Thus heel and toe wear can be remarkably improved, when in FIG. 1, a pair of the notch grooves 7 are spaced from each other by an interval p equivalent to the distance n between the notch groove 7 and the transverse groove 3. Each of the notch grooves 7 has a length r of 0.2–0.4 time as long as the transverse width m of the block 4; the depth $d_1$ of the notch groove 7 is 0.7–1.0 time, particularly not less than 0.85 time of the depth $d_2$ of the main grooves; the ratio of the longitudinal length and the transverse width of the block 4, l/m, is in a range 1.4–2.5; and the groove width q of the transverse groove 3 is 0.5–0.7 time as wide as the interval n; and the depth d of the transverse groove 3 is 0.3–0.6 time, particularly 0.35–0.5 time as deep as the depth $d_2$ of the main groove 1.

If the depth d of the transverse groove 3 is less than 0.3 time as deep as the depth $d_2$ of the main groove 1, the traction performance necessary for the block pattern becomes insufficient. If it is over 0.6 time, the transverse groove does not serve very much to reinforce the rigidity of the edge portion 5 of the block 4. On the other hand, if the depth $d_1$ of the notch groove 7 is less than 0.7 time as deep as the depth $d_2$ of the main groove 1, the notch groove does not sufficiently serve to correct the difference in rigidity between the central portion 6 and the edge portion 5 through decreasing the block rigidity of the central portion 6 of the block 4. The depth $d_1$ is more preferably not less than 0.85 times that of the main groove in respect of the entire rigidity-balancing on the blocks.

With the above arrangement in which the profile of the blocks 4 in the block pattern according to the present invention is in S-letter or Z-letter form, the rigidity difference in each block 4 along the circumference of the tire is effectively mitigated, so as to assuredly prevent the heel and toe wear without deteriorating the traction performance of the tire.

The present invention will be explained more in detail with reference to the following Example, but it is merely illustrative of the invention and not intended to limit the scope thereof.

With respect to test tires of a tire size of 10.00 R20 14PR, tread patterns shown in FIGS. 1 and 2 were applied. Such tires were mounted on all wheels of a test truck, and actually run for 60,000 km. The resulting heel and toe wear was calculated as a stepped difference between the adjacent blocks along the circumference of the tread. Further, braking was started on snow from a vehicle speed of 30 km/hr and a braking distance until stopping was measured. Also, a braking distance from a vehicle speed of 50 km/hr was measured on a wet road. Results are all below by index taking those in the case of the tread pattern shown in FIG. 2 as 100.

|  | Stepped difference | Braking distance on snow road | Braking distance on wet road |
| --- | --- | --- | --- |
| Conventional pattern | 100 | 100 | 100 |
| Invention pattern | 68 | 101 | 99 |

The dimensions of the test tires were as follows:

| | |
| --- | --- |
| tread width | 190 mm |
| width of main groove 1 | 12 mm |
| depth ($d_2$) of main groove 1 | 16.5 mm |
| average zigzag pitch of main groove 1 | 60 mm |
| width (q) of transverse groove 3 | 10.0 mm |
| width of transverse groove 3' | 7.0 mm |
| depth (d) of transverse groove 3 | 7.0 mm |
| depth of transverse groove 3' | 16.5 mm |
| length (l) of block 4 | 50.0 mm |
| length of block 4' | 21.0 mm |
| width (m) of block 4 | 28.0 mm |
| width of block 4' | 27.0 mm |
| interval (p) between notch grooves 7 | 18.0 mm |
| interval (n) between transverse groove 3 and notch groove 7 | 17.0 mm |
| length (r) of notch groove 7 | 8.0 mm |
| depth ($d_1$) of notch groove 7 | 16.5 mm |

According to the present invention, the uneven wear of all season type tread patterns of the heavy duty pneumatic tire can be effectively reduced without being accompanied by the deterioration of the traction performance on the snow and wet roads, thereby contributing to the improvement of the durability of the tires of this kind.

What is claimed is:

1. A pneumatic tire excellent in uneven wear resistance, said pneumatic tire having a tread pattern comprising: a plurality of wide main grooves extending zigzag along the circumference of a tread, numerous wide transverse grooves linearly extending in at least one land portion defined between the adjacent main grooves at and between the main grooves, said transverse grooves having a depth shallower than the main grooves, each of said transverse grooves being provided in each zigzag pitch of the main groove, a number of blocks separatedly formed and arrayed by the main grooves and the transverse grooves, and a pair of notch grooves provided in each of the blocks, said notch grooves branching from the main grooves sandwiching the block for mitigating difference in rigidity between the edge portions and the central portion of the block.

2. A tire according to claim 1, wherein a pair of the notch grooves are separated from each other by an interval substantially equal to an interval between the transverse groove and the notch groove.

3. A tire according to claim 1, wherein the notch groove has a length in a range of 0.2–0.4 time as long as the transverse width of the block.

4. A tire according to claim 1, wherein the depth of the notch groove is from 0.7 to 1.00 time as deep as that of the main groove.

5. A tire according to claim 4, wherein the depth of the notch groove is not less than 0.85 time as deep as that of the main groove.

6. A tire according to claim 1, wherein the ratio l/m between the longitudinal length and the transverse width of the block is in a range of 1.4–2.5.

7. A tire according to claim 1, wherein the groove width of the transverse groove is in a range of 0.5–0.7 time of the interval between the transverse groove and the notch groove.

8. A tire according to claim 1, wherein the depth of the transverse groove is in a range of 0.3 to 0.6 time as deep as that of the main groove.

9. A tire according to claim 8, wherein the depth of the transverse groove is in a range of 0.35–0.5 time as large as that of the main groove.

* * * * *